United States Patent
Main et al.

(10) Patent No.: US 7,900,041 B2
(45) Date of Patent: Mar. 1, 2011

(54) SOFTWARE CONDITIONAL ACCESS SYSTEM

(75) Inventors: Alexander Main, Dunrobin (CA); Harold J. Johnson, Nepean (CA)

(73) Assignee: Irdeto Canada Corporation, Ottawa (CA)

( * ) Notice: Subject to any disclaimer, the term of this patent is extended or adjusted under 35 U.S.C. 154(b) by 1037 days.

(21) Appl. No.: 10/895,948

(22) Filed: Jul. 22, 2004

(65) Prior Publication Data
US 2005/0039025 A1 Feb. 17, 2005

(30) Foreign Application Priority Data
Jul. 22, 2003 (CA) .................................... 2435760

(51) Int. Cl.
*H04L 29/06* (2006.01)
(52) U.S. Cl. ...................................... 713/155
(58) Field of Classification Search ................. 713/158, 713/155
See application file for complete search history.

(56) References Cited

U.S. PATENT DOCUMENTS

| | | | | |
|---|---|---|---|---|
| 5,808,767 | A * | 9/1998 | Williams et al. | 398/70 |
| 6,496,928 | B1 * | 12/2002 | Deo et al. | 713/153 |
| 2002/0013772 | A1 * | 1/2002 | Peinado | 705/51 |
| 2002/0040347 | A1 * | 4/2002 | Murakami et al. | 705/51 |
| 2002/0120574 | A1 * | 8/2002 | Ezaki | 705/51 |
| 2003/0055657 | A1 * | 3/2003 | Yoshida et al. | 704/500 |
| 2003/0084349 | A1 * | 5/2003 | Friedrichs et al. | 713/201 |
| 2003/0110382 | A1 * | 6/2003 | Leporini et al. | 713/172 |
| 2003/0163718 | A1 * | 8/2003 | Johnson et al. | 713/193 |
| 2004/0054920 | A1 * | 3/2004 | Wilson et al. | 713/200 |
| 2004/0125959 | A1 * | 7/2004 | Beuque et al. | 380/279 |
| 2004/0187029 | A1 * | 9/2004 | Ting | 713/201 |

OTHER PUBLICATIONS

Collins English Dictionary, HarperCollins Publishers, 2000, Definition of Intermittent.*
Collins English Dictionary, HarperCollins Publishers, 2000, Definition of Periodic.*
Collins English Dictionary, HarperCollins Publishers, 2000, Definition of Irregular.*
Collins English Dictionary, HarperCollins Publishers, 2000, Definition of Random.*

* cited by examiner

*Primary Examiner* — Kambiz Zand
*Assistant Examiner* — Cordelia Zecher
(74) *Attorney, Agent, or Firm* — Leslie A. Kinsman; Borden Ladner Gervais LLP

(57) ABSTRACT

Systems and methods which may be implemented as software to control access to content streams transmitted from a service provider's server. A software solution forces each set top box (STB) to periodically uplink to the server and to receive authentication from that server. To prevent spoofing, the server periodically loads to each STB at least one unique key that is required to access the content stream or that is required for authentication. The key or keys may be periodically revoked and/or replaced by the server. The frequency of the revocation and/or replacement of the key is ideally not fixed. Also, the server may periodically upgrade the decoding and/or authentication software on the STBs via the uplink.

29 Claims, 2 Drawing Sheets

SOFTWARE CONDITIONAL ACCESS SYSTEM

FIELD OF THE INVENTION

The present invention relates generally to security systems. More specifically, it relates to systems and methods which may be used to control access to broadcast content to be received by cable boxes, satellite boxes, and other set top boxes (STBs).

BACKGROUND TO THE INVENTION

The growth of the cable TV industry and the satellite broadcast industry has provided consumers with a veritable cornucopia of content for their viewing pleasure. With the current offerings of some cable and satellite broadcasters, it is not uncommon for a household to have access to as many as 200 channels. With such an entertainment bonanza at stake, it is no surprise that people who pirate cable and satellite signals abound.

Generally, the conditional access system that is used to prevent access to the cable and satellite signals is hardware based. The signal from the service provider is transmitted or broadcast to all users in an encrypted format or a scrambled format and only those users who have the proper facilities and access codes can decrypt or descramble the signals. The access codes are currently stored in smart cards that have to be inserted in the set top boxes (STB) that are used as cable and/or satellite boxes. Unfortunately, that smart cards are very vulnerable to cloning and/or copying such that a cloned card, used on a proper STB, can give an end user practically complete access to all the offerings of the cable/satellite feeds without paying for them.

It should be noted that current smart cards are used to store data that is used to decrypt a control word from the service provider's server. The decrypted control word is then passed to a descrambler that descrambles the content stream received from the server.

One of the main vulnerabilities of the smart cards lies in their static physicality. The cards are removable, easily cloned, and, as such, the cloned cards are easily distributable to the ever willing consumer who wants something for almost nothing. The sheer physicality of the card is one feature that militates against frequent card and/or code changes. To change the cards, the content distributors (the cable and satellite companies) must send out new cards to their subscribers and must therefore bear the costs of such a large distribution. To attempt changing the code with any frequency that hampers these content stream pirates is to bear the brunt of massive distribution and/or retooling costs. A few companies have announced that smart cards and the codes on them will be changed once a year. However, such a low replacement frequency will still give pirates a chance to formulate either a workaround to the new cards or a chance to clone and distribute the new cards.

What is therefore required is a solution which avoids or at least mitigates the shortcomings of the prior art. Such a solution should allow service providers to change control words or access codes or keys without the large expenses attendant with the use of smart cards of other hardware based solutions. Ideally, such a solution should also allow service providers to update whatever encoding schemes are being used with minimal effort and expense.

SUMMARY OF THE INVENTION

The present invention relates to systems and methods which may be implemented as software to control access to content streams transmitted from a service provider's server. A software solution forces each STB to periodically uplink to the server and to receive authentication from that server. To prevent spoofing of the server, the server periodically loads to each STB at least one unique key that is required to access the content stream or that is required for authentication. The key or keys may be periodically revoked and/or replaced by the server. The frequency of the revocation and/or replacement of the key is ideally not fixed. Also, the server may periodically upgrade the decoding and/or authentication software on the STBs via the uplink.

In one aspect, the present invention provides a method for controlling a remote client's access to a network having at least one server, the method comprising requiring said client to communicate with and be verified by said at least one server regarding at least one key when any one of the following specific events occur:
  said client is initialized
  said at least one server requests verification of said client
  a predetermined event whose timing is random
  an expiry of a predetermined time period
  after said client has been disconnected from said server for a predetermined time.

In a second aspect, the present invention provides a system for managing access by a set top box (STB) to multimedia content from at least one server, said system being contained in said set top box, said system comprising:
  at least one encryption module for encrypting and decrypting communications between said STB and said at least one server;
  a key management module for managing keys received and/or sent to said at least one server, each of said keys being encrypted by said at least one encryption module prior to said keys being sent and/or stored;
  a subscriber management module for managing said STB's registration with an authentication by said at least one server, said subscriber management module causing said key management module to transmit and/or receive keys to or from said at least one server; and
  a data storage module for managing storage of data on said STB, said data including said keys, said data being encrypted by said at least one encryption module prior to being stored.

BRIEF DESCRIPTION OF THE DRAWINGS

A better understanding of the invention will be obtained by considering the detailed description below, with reference to the following drawings in which.

DETAILED DESCRIPTION

Figure 1:
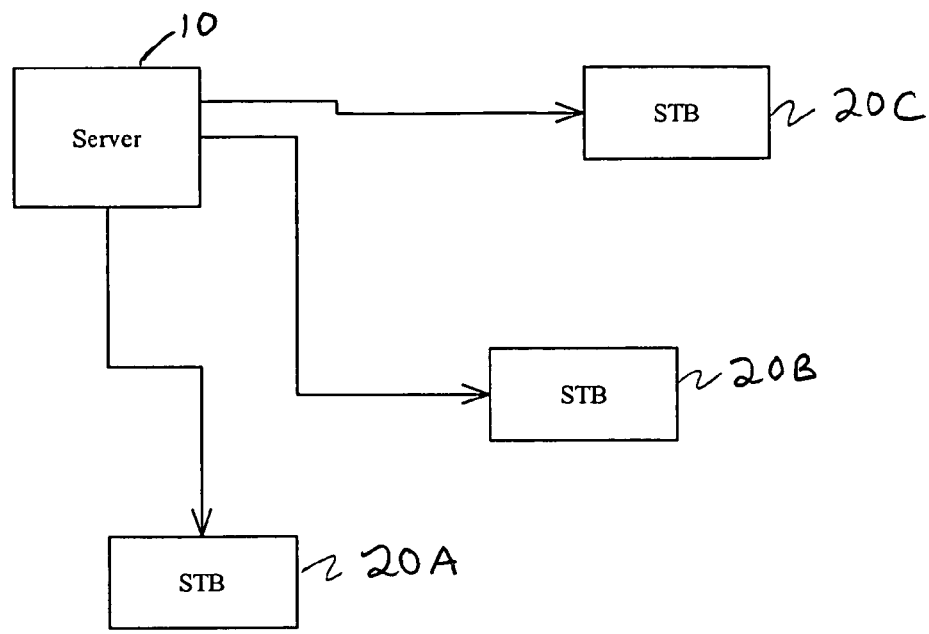
FIG. 1 is a schematic overview of a content stream distribution system.

Referring to FIG. 1, a schematic overview of a content stream distribution system is illustrated. A service provider server 10 distributes a content stream to recipients 20A, 20B, 20C. The recipients 20A, 20B, 20C may be set top boxes (STBs) or any other end user equipment configured to receive the content stream. The content stream may be in the form of a satellite feed to an end user dish antenna or in the form of a cable TV signal distributed to the end user STBs 20A, 20B, 20C via conventional cable distribution channels. It should be noted that the server 10 and the STBs 20A, 20B, 20C are in a client-server configuration with the STBs 20A, 20B, 20C being the clients of the server 10. However, for ease of reference, the clients 20A, 20B, 20C will be referred to as STBs throughout the description. It should also be noted that while only one server is illustrated and discussed in this document, multiple servers may also be used.

The content of the content stream that is broadcast may be a TV signal, a multimedia presentation, video on demand content, software for execution on the STB, or any other suitable content which may be distributed to the end user.

As noted above, one current method of controlling access to the content stream is by way of smart cards. In this scheme, each STB is equipped with a smart card supplied by the service provider and which contains at least one control word. The control word is used by the STB to decode or descramble the content stream which is broadcast in a scrambled format. Without a smart card with the proper programming, the STBs either cannot access the content stream at all or the STBs can receive but not descramble the content stream. Ideally, only legitimate end users who have paid for the service are the only ones who are in possession of the properly programmed smart cards. However, as noted above, pirates are currently able to clone/copy the legitimate smart cards. These unauthorized smart cards are also able to decode the content stream. Every time a new smart card is issued to the legitimate subscribers, pirates are able to clone the newly distributed smart cards and distribute these illegitimate copies to the unauthorized subscribers.

One way to defeat the pirates is to force each STB to periodically uplink to the server 10 for authentication. The uplinking STB should upload to the server 10 at least one identification key or tag which the server can use to determine whether the uplinking STB is legitimate or not. If the uplinking STB is determined to not be legitimate, that STB is prevented access to the content stream.

It should be noted that the uplinking requirement is not optional to the STB. The STB should uplink to the server once the STB is initiated and whenever the server requests authentication of that particular STB. The STB may also uplink periodically for authentication even without the server requesting such authentication. To confuse potential pirates and hackers who are trying to circumvent the system, the server should request authentication at both regular intervals (e.g. every 5 hours) and at random times. The timing of the required uplinking should be set by the server and is, ideally, configurable and renewable by the operators of the server.

The strategy behind the timing of the authentication is to force the STBs to uplink at specific intervals. However, since predictability is a weakness that can be exploited by those seeking to reverse engineer and circumvent the system, randomly timed events may be used by the server to request authentication. As an example, the server may request authentication between movies being broadcast on an all-movie channel. Similarly, the server could request authentication after every 2 or 3 shows broadcast on an all-sitcom channel. A timer located in the server could set off an authentication or verification request from the server. A timer in the STB could also signal the STB to request authentication or verification from the server. The timer may be set by a message from the server. Finally, to catch any STBs which may have been reverse engineered or tampered with, the STB should be required to request authentication from the server after the STB has been disconnected for a certain period of time. As an example, if the STB has been disconnected from the server for more than 3 days, the STB should request authentication from the server.

The requirement for the STB to uplink to the server will serve a number of purposes. Not only will the periodic uplinks serve to confirm to the server the identity and hence the legitimacy of the uplinking STB, it will also give the server the opportunity to upload to the STB new data and/or software which can be used to provide better service. Once the STB uplinks to the server, the server can upload updated versions of software to the STB. The software can be new or updated descrambling software, new or updated authentication software, or software which provides new services to the end user. The uplinking will also provide the server with the opportunity to upload new identification keys or tags to the STBs as well as the opportunity to revoke previously issued keys or tags. The periodic replacement and/or revocation of the identification keys will force pirates to continuously modify and reengineer new methods for circumventing the system. The ID keys which may be periodically revoked and/or replaced may be used in the determination of the control word or they may be used in the decoding of the control word in addition to the authentication of the STB.

With respect to the identification keys, two types of keys may be used to authentication purposes. A fixed key, derived from fixed identification data stored on the STB can be used as well as a changeable key. The fixed identification data may be the serial numbers immutably assigned to the separate components of the STB during the manufacture of the separate components. Similarly, the STB itself may have its own serial number assigned to it during its manufacture. This serial number may be used as one of the fixed identification data or it may be used to derive such identification data. The fixed identification data can be used to derive the fixed key through conventional encoding techniques. The fixed key may be used to "fingerprint" the STB. Since the identification data embedded on the STB and used to derive the fixed key is fixed, each STB can be assigned a digital fingerprint that is unique to that single STB. The server 10 can thus record the digital fingerprint of all the STBs it serves. Any new STB seeking authentication must, ideally, first be manually registered with the server.

The other type of key which may be used is a changeable key. This key would, ideally be distributed to the STB by the server. The changeable key would, in addition to being distributed by the server, be revocable and replaceable by the server. The revocation and replacement of the changeable key, which may be used for authentication as well as perhaps for unlocking the control word that descrambles the content stream, should be done at regular intervals to ensure that, even if the keys are compromised, they are not compromised for long. Also, regular revocation and replacement of the changeable key would force pirates to continuously retool and rework their countermeasures.

To make it more difficult for pirates to retrieve the identification keys, and indeed all of the keys used by the STB, all of the keys should be encrypted prior to being saved in the STB and prior to being transmitted to the server. In fact, encryption is ideally used throughout the STB to prevent pirates from reverse engineering the system. The data flow between the different software modules which will be running on the STB is ideally masked and the storage of the software can be masked as well using techniques disclosed in U.S. Pat. No. 6,594,761, US Patent Publication US 2003/0163718, and PCT Publication WO 02/095546, all the contents of which are herein incorporated by reference.

As a further defense against piracy, a periodic re-keying strategy is recommended for the changeable keys. Currently, keying systems are stateless in nature in that the keys and the control words distributed on the smart cards are independent of previous keys and control words. A re-keying strategy which has a stateful nature uses new keys that are based on previous keys. Thus, an STB uplinking to a server for authentication may generate a new changeable key based on a key previously received from the server to gain access to the server.

With respect to the changeable keys distributed by the server to the STBs, session keys may be used for at least one of these changeable keys The server can generate unique keys that will be used to encrypt the control words transmitted to the STBs. Depending on a revocation list, the server can encrypt the control word so that only STBs with the appropriate privilege set (and the proper session keys) can decrypt it.

To minimize bandwidth for the transmission of the different control words for the different content streams for the different channels, all of the control words may be encrypted with a session key and a group key encryption can be applied to the session key. As an example, the total number of messages that need to be sent out to revoke unauthorized STBs grows geometrically as the number of revocations increases if session keys are not used. On the other hand, if session keys are used, the number of messages only grows linearly.

The rationale behind this reduction in the number of messages is that each revocation message allows a subset of the STBs the ability to decrypt the encrypted control word. The unauthorized STBs are not able to decrypt the control word and, as such are unable to decode the content stream. As an example, if an group key (a key given to all authorized STBs) is the only key used to encrypt the control word for a 1000 channel system and the STBs on the system is planned as a binary tree of height 3, then 3 revocation messages are required to revoke one unauthorized STB on the tree. Without the use of the session key, then 3000 messages will have to be sent to each STB—one revocation message for each channel as it is the group key being effectively revoked. Conversely, the use of a session key that encrypts the control word and is, in turn, encrypted by a group key only required 1003 messages sent to each STB. One message for each channel is required and this message contains the session key encrypted control word. One message each is also required for the 3 revocation messages. In this case, the unauthorized STBs will no be given the proper authorization as the session keys it has possession of are no longer authorized and hence these old session keys will not be able to decode the control word. In the non-session key scenario, the unauthorized STBs are unable to decrypt the actual control words because the group key has been changed. Both scenarios have the effect of locking out the unauthorized STBs but at the cost of larger bandwidth usage for the non-session key scenario.

To further frustrate pirates and their freeloading customers and to maximize the bandwidth used in the transmission of the different changeable keys and control words, a revocation list may be used. The revocation list would include a subset of all STBs on the system. By continuously changing the revocation list to ensure that all users are revoked at one time or another, the pirates will be continually forced to reengineer their hacks or workarounds. As a refinement, all the STBs on the revocation list (managed and kept by the server) need not be revoked all at once. A subset of the STBs on the revocation list would be revoked for each revocation cycle. For the next cycle, another subset of the STBs on the revocation list would then be revoked. Once all the STBs on the revocation list have been revoked (and the legitimate ones reinstated by sending them the proper control words and session keys), a new revocation list is then constructed from the remaining STBs that are known to be active. Revocation cycles, during each of which new session keys and possibly new control words may be broadcast, may be as frequent as every 10 seconds.

To clarify between the group key, the session keys, and the control word, each content stream or channel is decoded by a control word. As such, a sports channel may be decoded by a different control word from a control word that decodes a news channel. Thus, it is possible for a 1000 channel line-up to have 1000 different control words. However, it is also possible that groups of channels may be decoded by a single control word to ease the bundling of channels. In the above scheme, each control word can be decrypted by a session key. Each session key is decrypted by a group key. The group key is a changeable key that is uploaded to each STB that is authenticated by the server. The session key is also uploaded to the SSTBs as and when needed by way of messages from the server. The session keys are not all the same and different session keys may be given to different STBs. Thus, a first group of STBs (e.g. STB1, STB2, ... STB10) may be given session keys A and B. A second group of STBs (e.g. STB3, STB4, ... STB8, STB9, STB 10, STB11, STB12) may be given session keys C, D, and E. A third group of STBs (e.g. STB 11, STB12, STB13, STB14) may be given session keys E, F, G, and H. To revoke STB 1. STB 2; STB 13, and STB14, messages containing a new control word or a newly encrypted control word is sent to all the STBs. At the same time or soon after this, other messages that only allow the decryption of session keys C and D are also sent out. This means that, since STB3-STB 12 have either session key C or D, then they are allowed to continue while STBs STB1, STB2, STB13, and STB14, since they do not have either of the two allowed session keys, are not allowed to decode the content streams as their session keys cannot decrypt the newly received control word. Thus, STB1, STB2, STB13, and STB14 have been effectively revoked.

To keep the pirates even more confused and frustrated, the group key should, ideally, be periodically replaced. To accomplish this without requiring a massive number of messages sent to each STB in the system, the changeover to the new group key can be gradual. When STBs uplink to the server, the new group key can be transmitted to them by the server. This will have the effect of revoking unauthorized STBs that do not uplink. This process can be represented by a binary tree with the STBs as the leaves on the tree. A tree can represent a group of STBs which are using a specific group key. Thus, gradually changing the group key being used is analogous to moving the leaves from an old tree (representing the old group key) to a new tree (representing the new group key). Revoking discontinued or pirate nodes or STBs can be as simple as not moving them to a new group key tree.

The above scheme forces all STBs to uplink and "ages" trees and branches, thereby forcing STBs on to the new tree. This ensures a well-balanced tree and minimizes the number of revocation messages. Revocations will occur until the message bandwidth limit is reached. At this point, STBs from the old tree can no longer be revoked until all the users have migrated to the new tree. However, many revocations can still be performed without increasing the number of messages. As the tree becomes more fragmented, multiple STBs can be revoked with one message and without requiring the addition of a message on the new tree.

Once the new tree is complete, the process begins anew. The time to fully migrate from the old tree to the new tree is related to the time it takes to reach the message bandwidth limit. Those users who do not uplink will be revoked when their branch ages beyond any grace period. They will therefore need to uplink prior to resumption of service.

Figure 2:
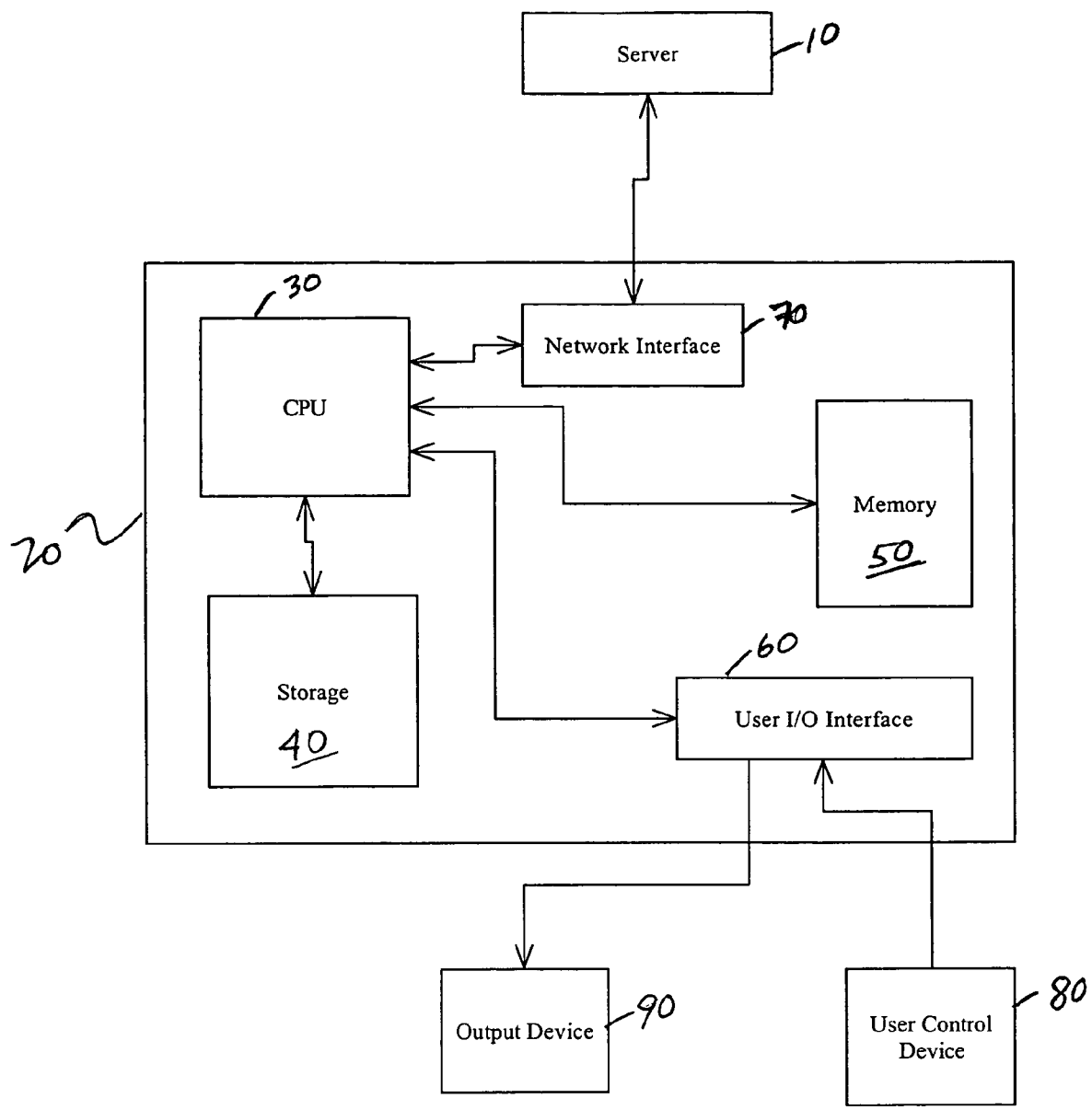
FIG. 2 is a drawing of a general configuration of an STB on which the invention may be applied.

The scheme described above can be installed in STBs that have a general configuration as illustrated in FIG. 2. The STB 20 in FIG. 2 has a CPU 30, data storage means 40, memory 50, a user input/output (I/O) interface 60, and a network interface 70. The user I/O interface receives input from a user control device 80 (such as a remote control or a keyboard) and sends output to an output device 90 (such as a television of a monitor). The network interface 70 sends and receives signals to and from the server 10. The storage means 40 may be any known data storage means such as a hard drive, EEPROM, flash memory, or any other non-volatile data storage medium. Software, keys and other data are stored in the storage means 40. The memory 50 encompasses volatile memory means such as RAM (Random Access Memory). The CPU 30 processes data received from the different components of the STB 20. Software code stored in the storage means 40 is executed by the CPU 30 and encrypted keys received from the server 10 are decrypted by the CPU. Scrambled content streams are received from the server 10 are, using control words decrypted by the CPU, decoded by the CPU and transferred to the user I/O interface for presentation to the user via the output device 90.

The software required to implement the scheme described above may have the structure as set out in FIG. 3. To store the control words, group key, session keys, the identification keys, or any other data noted above, a data storage module 100 that deals with the hardware of the storage means 40 is used. The data storage module 100 may include instructions and software code that masks or hides the actual physical addresses used for the storage of the data. Methods as described in US Patent Publication US 2003/0163718 may be used for this masking.

Figure 3:
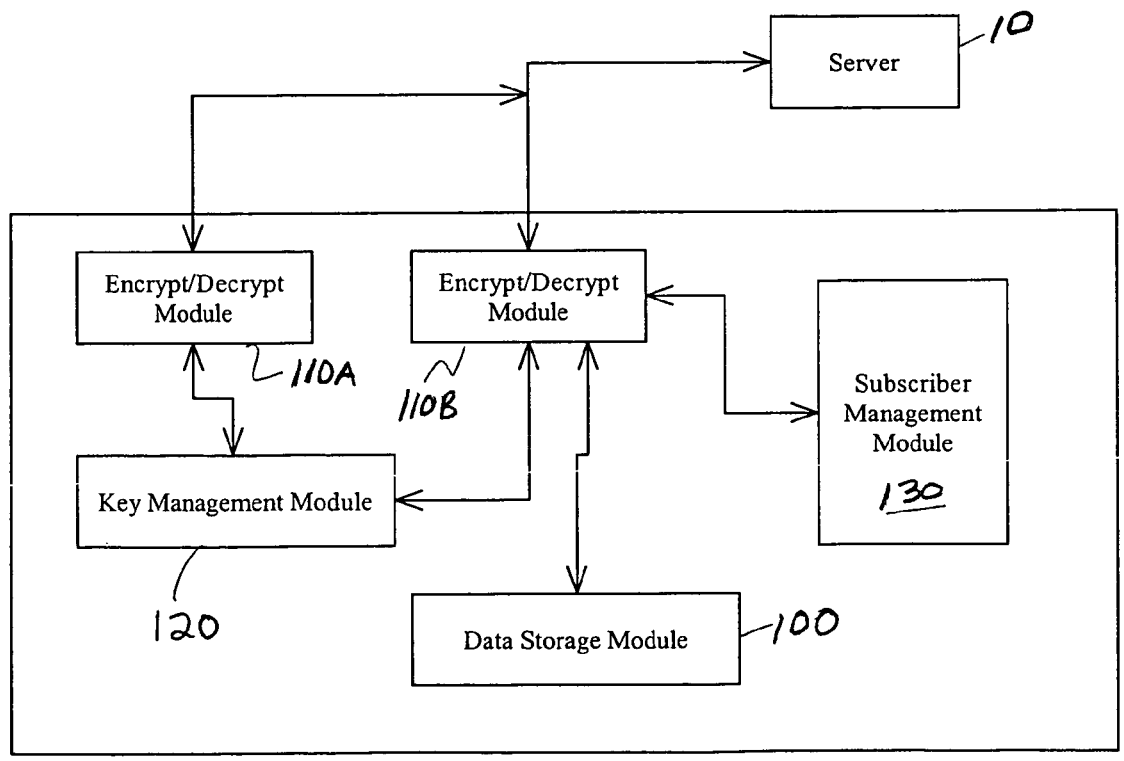
FIG. 3 is a block diagram of the modules which may be used in practicing the invention.

Prior to storing the keys and other sensitive data on the storage means 40, it is advisable to encrypt the data in addition to masking the actual storage addresses. To this end, encryption/decryption modules 110A, 110B may be used. While FIG. 3 illustrates two encryption/decryption modules, a greater number of such modules may be used. At a minimum, one encryption/decryption software module should be present to handle the encryption/decryption tasks that communications between the server 10 and the STB 20 entail. Such encryption/decryption modules may use white box cryptography or any other cryptographic methods or systems that are appropriate.

A key management module 120 communicates with the encryption/decryption modules 110A, 110B and manages the various keys and control words necessary for the proper decryption and decoding of the various keys and content streams received by the STB. The key management module 120 communicates with the encryption/decryption modules 110A, 110B for another reason—any key or control word, according to the scheme above, is encrypted before it is transmitted to the server 10 or stored by the data storage module 100.

Working with the key management module 120 is the subscriber module 130. The subscriber module 130 deals with the registration and authentication needs of the STB 20. Thus, the key management module 120 sends the appropriate keys to the server 10 (via the encryption/decryption modules 110A, 110B) upon instructions from the subscriber module 130. Similarly, upon being authenticated by the server 12, the subscriber module 130 receives the properly encrypted control words from the server 10 and sends these to the key management module 120 for use and/or storage by the storage module 100.

In one contemplated embodiment, the STB is initially configured with the minimum of software. The STB, when initialized, merely has enough software to uplink to the server. Once the STB has uplinked and been authenticated by the server by way of the fixed identification key derived from the hardware serial numbers, the server uploads to the STB all the software that will be needed to decode the content stream and to receive continual updates on the software. The software uploaded to the STB may contain all the keys necessary along with the encryption/decryption routines and the communications routines required for periodic and ongoing communications with the server. Once the software is uploaded and is up and running, the STB will work as a regular STB according to the scheme described above. However, once the STB is powered down, the software is deleted, thereby preventing pirates from reverse engineering and analyzing the software. The software uploaded to the STB by the server subsequent to the STB's initialization may take the form of the software modules discussed above.

As noted above, the periodic uplinking of the STB or client to the server can provide the server the opportunity to send to the STB newer versions of software. As an example, any of the software modules described above may be loaded to the STB from the server when the STB uplinks. The software modules may therefore be renewed, upgraded, and/or replaced by the server when appropriate.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

What is claimed is:

1. A system for managing access by a set top box (STB) to multimedia content from at least one server, said system being contained in said set top box, said system comprising:
    at least one encryption module for encrypting and decrypting communications between said STB and said at least one server;
    a key management module for managing keys received and/or sent to said at least one server, each of said keys being encrypted by said at least one encryption module prior to said keys being sent and/or stored;
    a subscriber management module for managing said STB's registration with and authentication by said at least one server, said subscriber management module causing said key management module to transmit and/or receive keys to or from said at least one server; and
    a data storage module for managing storage of data on said STB, said data including said keys, said data being encrypted by said at least one encryption module prior to being stored
    wherein said subscriber management module is configured to receive authentication requests from said server, both at regular intervals and at randomly chosen times, said authentication requests causing said subscriber management module to uplink to said server, to generate a changeable key based on a key previously received from the server, to authenticate to said server using the changeable key, and to obtain a download from the server necessary to display said content, said download preventing cloned STB's from being able to display said content, even if the STB has previously obtained a key, by including at least one key which the server periodically changes.

2. A system according to claim 1 wherein each of said modules in said system are software modules executed by a data processor in said STB.

3. A system according to claim 2 wherein at least one of said keys is periodically revoked by said server.

4. A system according to claim 2 wherein at least one of said keys is periodically replaced by said server.

5. A system according to claim 1 wherein at least one of said at least one encryption module uses white box cryptography for encryption.

6. A system according to claim 1 wherein at least one of said keys is used to decode a content stream containing said multimedia content from said server.

7. A system according to claim 1 wherein said set top box uplinks to said server whenever an event selected from the following group occurs:
    said set top box is initialized
    said at least one server requests verification of said set top box
    a predetermined event whose timing is random
    an expiry of a predetermined time period
    after said set top box has been disconnected from said server for a predetermined time.

8. A system according to claim 1 wherein at least one of said modules is replaceable by said server.

9. A system according to claim 1 wherein at least one of said modules is received from said server and installed on said system subsequent to said system being initialized.

10. A system according to claim 9 wherein said at least one of said modules is deleted from said STB when said STB is powered down.

11. A system according to claim 1, wherein the STB uploads to the server at least one identification key which the server can use to determine the legitimacy of the uplinking STB.

12. A system according to claim 11, wherein the fixed key is derived from the serial number of the STB itself.

13. A system according to claim 12, wherein conventional encoding techniques are used for the derivation.

14. A system according to claim 11, wherein the identification key is a fixed key derived from a set of serial numbers immutably assigned to separate components of the STB.

15. A system according to claim 14, wherein conventional encoding techniques are used for the derivation.

16. A method for controlling a remote client's access to content from a network having a server, the method comprising:
    said client receiving authentication requests from said at least one server at both regular intervals and at randomly chosen times;
    said client generating a changeable authentication key based on a key previously received from said at least one server, and uplinking with said at least one server in response to each of said authentication requests;
    said server authenticating said client during said uplink using the changeable authentication key; and
    upon authentication, said client retrieving a download from said server during said uplink which is necessary for said client to display said content, even if the remote client has previously obtained a key;
    said download including at least one changeable key which is changed by said server, both at regular intervals and at randomly chosen times.

17. A method according to claim 16 wherein said client periodically receives at least one software module from said server when said client communicates and is verified by said server, wherein the server determines whether said client is to receive said at least one software module, the receiving and installation of which is not optional to the client.

18. A method according to claim 17 wherein said at least one software module is selected from a group comprising:
    at least one encryption module for encrypting and decrypting communications between said client and said at least one server;
    an key management module for managing keys received and/or sent to said at least one server, each of said keys being encrypted by said at least one encryption module prior to said keys being sent and/or stored;
    a subscriber management module for managing said client's registration with and authentication by said at least one server, said subscriber management module causing said key management module to transmit and/or receive keys to or from said at least one server; and
    a data storage module for managing storage of data on said client, said data including said keys, said data being encrypted by said at least one encryption module prior to being stored.

19. A method according to claim 18 wherein said at least one software module is an upgraded version of a previous software module.

20. A method according to claim 16 wherein said download includes software which is necessary for the display of said content and is periodically changed by said server.

21. A method as claimed in claim 16 wherein upon each initialization of said client, said client uplinks with said server to download software necessary to display said content.

22. A method according to claim 21 wherein said client requires a key previously distributed by said at least one server to said client in order to obtain said at least one changeable key.

23. A method according to claim 22 wherein said key previously distributed by said server to said client is periodically revoked by said server.

24. A method according to claim 23 wherein said server maintains revocation lists of clients to be periodically revoked and causes revoked clients to go through another authentication process.

25. A method according to claim 22 wherein said key previously distributed by said server to said client is periodically replaced by said server.

26. A method according to claim 16 wherein said at least one changeable key is encrypted by said server when distributed by said server and can only be decrypted by a client which has been previously authenticated by said server.

27. A method according to claim 16 wherein said client receives multiple types of keys from said server, including control words, session keys and group keys.

28. A method according to claim 27 wherein said client receives at least one message from said server, said at least one message allowing at least one of said multiple keys to be used to decode a content stream from said server.

29. A method according to claim 27 wherein said control words are used to decrypt content, the session keys are used to decrypt the control words, and the group keys are used to decrypt the session keys, and wherein the group keys given to STBs differ, and wherein said group keys are aged by the server such that groups of STBs can be revoked at different times, forcing the revoked STBs to uplink with the server to authenticate and to obtain current keys.

* * * * *